(12) United States Patent
Jung et al.

(10) Patent No.: US 7,879,254 B2
(45) Date of Patent: *Feb. 1, 2011

(54) SNOW REMOVAL AGENT AND PREPARATION METHOD

(76) Inventors: Seung Cheol Jung, 2-12 Songdo-Dong, Yeonsu-Gu, 102-1601 Songdo Seongji Libellus Apt., Incheon (KR) 406-737; Moo Woong Jung, 630-1 Dorim-Dong, Namdong-Gu, 204-403 Jugong Greenvill Apt., Incheon (KR) 405-785

( * ) Notice: Subject to any disclaimer, the term of this patent is extended or adjusted under 35 U.S.C. 154(b) by 0 days.

This patent is subject to a terminal disclaimer.

(21) Appl. No.: 12/651,359

(22) Filed: Dec. 31, 2009

(65) Prior Publication Data

US 2010/0102267 A1   Apr. 29, 2010

Related U.S. Application Data

(63) Continuation of application No. 12/160,412, filed on Jul. 9, 2008, now Pat. No. 7,666,324.

(30) Foreign Application Priority Data

Jan. 25, 2006   (KR) .................. 10-2006-0007721

(51) Int. Cl.
*C09K 3/18* (2006.01)
(52) U.S. Cl. ........................... 252/70; 106/13
(58) Field of Classification Search ............... 106/13; 252/70
See application file for complete search history.

(56) References Cited

U.S. PATENT DOCUMENTS

| 4,676,918 A | 6/1987 | Toth et al. | |
| 7,666,324 B2 * | 2/2010 | Jung et al. | 252/70 |

FOREIGN PATENT DOCUMENTS

| CN | 1618916 A | 5/2005 |
| CN | 1693407 A | 11/2005 |
| WO | WO 98/47978 | 10/1998 |
| WO | WO 2004/013250 | 2/2004 |

* cited by examiner

*Primary Examiner*—Anthony J Green
(74) *Attorney, Agent, or Firm*—IPLA P.A.; James E. Bame

(57) ABSTRACT

A snow removal agent for melting snow, consisting of magnesium chloride, halite, urea, sodium tripolyphosphate and sodium metasilicate, wherein the sodium tripolyphosphate and the sodium metasilicate each account for an identical weight percentage in the agent, wherein the halite is crushed to a size of 7-20 mm and aged for 24-48 hours.

7 Claims, 1 Drawing Sheet

SNOW REMOVAL AGENT AND PREPARATION METHOD

CROSS REFERENCES

This application is a continuation of U.S. patent application Ser. No. 12/160,412 filed Jul. 9, 2008 and now issued to U.S. Pat. No. 7,666,324 which is incorporated herein by reference in its entirety.

BACKGROUND

The present invention relates to a snow removal agent and a preparation method thereof, more particularly to an environment-friendly, less-corrosive snow removal agent capable of removing snow effectively and a preparation method thereof.

In general, snow removal agents are classified into snow melting (ice melting) agents, which melt snow directly, and abrasive agents, which do not melt snow but temporarily increase friction on the snow-covered or frozen road surface.

Typically, sand is used as abrasive agent. Although it temporarily increases friction, a consistent effect cannot be expected as the sand particles gradually settle down and are buried in the snow.

Further, they cause the clogging of drainage pipes and water collection tanks, air pollution, damage to vehicles, etc., requiring more workforce and further cost. Thus, sand is restrictively used in ascending slopes, shaded areas, constantly frozen areas, bridges with no heat supply from the ground, etc.

The snow melting agents are largely classified into chlorides and non-chlorides. Chlorides are preferred to non-chlorides because of superior snow removal effect.

Of the chloride snow removal agent, calcium chloride is typically used because, when sprayed on snow or ice, it melts the snow or ice with strong water absorbency and exothermicity.

The heat required to melt the snow or ice (80 cal/1 g of ice) is provided by the heat of dissolution of calcium chloride (175 cal/g).

However, calcium chloride corrodes vehicles or metallic fixtures because of strong corrosiveness and, when absorbed in the soil, it causes yellowing or withering of plants.

In addition, calcium chloride causes the cracking of road surface because of the high heat of dissolution and is inconvenient to store because of high hygroscopy. In particular, it tends to become hardened when stored for a long time.

Further, when flown into rivers, calcium chloride causes the death of fish and shellfish.

And, in the case of the outer roads or bridges with light traffic, calcium chloride sprayed on the road surface tends to get wet and freeze again, requiring re-spraying of calcium chloride or resulting in freezing and clogging of drains.

SUMMARY OF THE INVENTION

The present invention was made to solve the aforementioned problems and an object of the present invention is to provide an environment-friendly snow removal agent, which reduces the corrosion of metallic materials of iron structures, automobiles, etc., is safe when used for a long period of time, is without the problem of re-freezing, significantly reduces the yellowing and withering of plants and is good for the growth of plants, and a preparation method thereof.

The present invention provides a snow removal agent for melting snow, which comprises magnesium chloride, halite, urea, sodium tripolyphosphate and sodium metasilicate.

As apparent from the above description, the snow removal agent of the present invention and the preparation method thereof provide the following advantageous effects.

First, since re-freezing does not occur following the spraying of the snow removal agent, the cost of snow removal agent spraying can be reduced and the chance of accidents can be decreased.

Second, since the snow removal agent is not hardened even in extended period of storage, the snow removal agent needs not be crushed for spraying.

Third, the snow removal agent is environment-friendly and unharmful to plants, fish and shellfish.

Fourth, the corrosion of metals, including iron structures, automobiles, etc. can be prevented.

Fifth, cracking of the roads due to high heat of dissolution can be prevented.

BRIEF DESCRIPTION OF THE DRAWINGS

The above and other objects, features and advantages of present invention will become apparent from the following description of preferred embodiments given in conjunction with the accompanying drawings, in which.

DETAILED DESCRIPTION OF THE INVENTION

Figure 1:
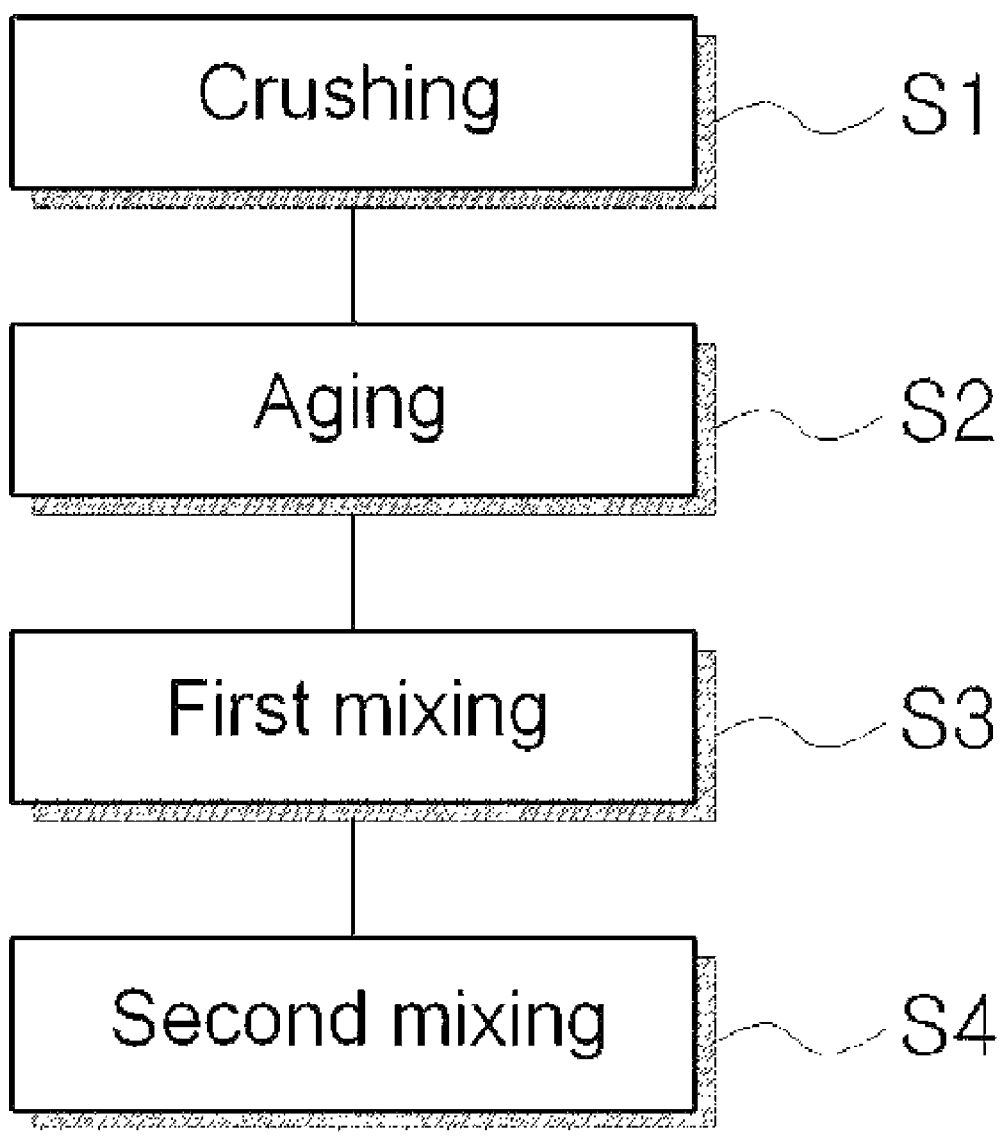
FIG. 1 is the flow chart for the preparation method of the snow removal agent in accordance with an embodiment of the present invention.

In an aspect, the present invention provides a snow removal agent composition comprises magnesium chloride, halite, urea, sodium tripolyphosphate and sodium metasilicate.

Preferably, the snow removal agent composition comprises 20-40 wt % of magnesium chloride, 45-75 wt % of halite, 0.1-20 wt % of urea, 0.1-30 wt % of sodium tripolyphosphate and 0.1-30 wt % of sodium metasilicate.

In another aspect, the present invention provides a preparation method of a snow removal agent, which comprises: a crushing step of crushing halite using a crusher; an aging step of aging the crushed halite; a first mixing step of mixing the aged halite with magnesium chloride in a stirring machine and stirring the mixture; and a second mixing step of adding sodium tripolyphosphate, sodium metasilicate and urea and stirring the resultant mixture.

Preferably, in the first mixing step, the mixture is dried with hot air of 45° C. to 55° C. while it is stirred.

Also, preferably, the aging step is continued for 24-48 hours.

And, in the crushing step, the halite is preferably crushed to a size of 7-20 mm.

The terms and words used in this description and the claims are not to be limited to their literal meanings. Based on the principle that an inventor can adequately define the concepts of terms and words in order to best describe his/her own invention, they shall be interpreted as conforming to the scope and spirit of the present invention.

Accordingly, those presented in the examples and drawings of this description are exemplary ones and various modifications and improvements can be made within the spirit and scope of the present invention.

The snow removal agent composition according to an embodiment of the present invention comprises magnesium chloride, halite, urea, sodium tripolyphosphate and sodium metasilicate.

Magnesium chloride ($MgCl_2$) is used in the composition of the present invention in order to overcome the problem of calcium chloride ($CaCl_2$) used in the conventional snow removal agents.

Magnesium chloride provides smaller heat of dissolution for initial thawing than calcium chloride. But, the large heat of dissolution of calcium chloride may result in the cracking of road surface.

Besides, calcium chloride is highly corrosive to metals, easily hardened when stored for a long time and harmful to plants, fish and shellfish. As will be described later, a mixture of magnesium chloride and halite dried with hot air can solve these problems.

Preferably, the magnesium chloride used in the composition of the present invention is magnesium chloride hexahydrate ($MgCl_2 6H_2O$).

In general, halite (rock salt, NaCl) is abstracted from ores. Differently from bay salt, halite contains less heavy metals and, thus, is environment-friendly and affects plants, fish or shellfish less when used in the snow removal agent.

In addition, because halite is less soluble, it remains for an extended period of time as granule after being sprayed. For this reason, a mixture of halite and magnesium chloride has improved anti-slip effect until the halite melts down.

Preferably, magnesium chloride and halite, the main components of the snow removal agent of the present invention, are comprised in the composition with a proportion of 20-40 wt % of magnesium chloride and 45-75 wt % of halite.

If magnesium chloride is comprised in less than 20 wt % or if halite is comprised in more than 75 wt %, the performance of the snow removal agent may be inconsistent and re-freezing may occur. Further, the snow removal agent remaining on the roads or bridges after use makes them dirty and increases the cost of cleaning.

In contrast, if magnesium chloride is comprised in more than 40 wt % or if halite is comprised in less than 45 wt %, the increased magnesium chloride content may lead to increased corrosiveness to metals and facilitate the hardening of the snow removal agent during storage.

Moisture included in magnesium chloride hexahydrate, a type of magnesium chloride, may be removed during the hot air drying of the preparation method of the snow removal agent, which will be described later, thereby leading to the prevention of the hardening of the snow removal agent.

In general, urea is incapable of thawing at $-5°$ C. or lower but is added to minimize the effect of magnesium chloride on plants.

Preferably, urea is comprised in 0.1-20 wt % in the composition of the present invention. If urea is comprised in less than 0.1 wt %, the snow removal agent can hardly supply nutrients to plants. In contrast, if it is comprised in more than 20 wt %, excessive supply of nutrients may negatively affect plants.

0.1-20 wt % of urea can adequately supply nutrients to plants, thereby significantly reducing the yellowing and withering of plants and contributing to the growth of plants.

Sodium tripolyphosphate ($Na_5P_3O_{10}$) is added to prevent the corrosion of metals that may be caused by magnesium chloride. Sodium tripolyphosphate is alkaline and relatively non-irritating to skin and has excellent cleaning effect.

Like sodium tripolyphosphate, sodium metasilicate is added to prevent the corrosion of metals. It prevents the snow removal agent from being solidified and hardened.

During the snow removal, magnesium chloride and halite, the main components of the snow removal agent of the present invention, are dissolved and decomposed to metal ions and chloride. The chloride binds with the metals to form metal chlorides and, thus, corrodes the metals.

However, the addition of the alkaline compounds sodium tripolyphosphate and sodium metasilicate oxidizes the chloride ion and prevents it from reacting with the metals.

Further, since sodium tripolyphosphate and sodium metasilicate are dissolved in water and have good cleaning effect, the roads or bridges can be maintained clean even without cleaning.

Preferably, each of sodium tripolyphosphate and sodium metasilicate is comprised in 0.1-30 wt % in the composition of the present invention.

If each of the sodium tripolyphosphate and the sodium metasilicate is comprised in less than 0.1 wt %, the snow removal agent composition may cause the corrosion of metals or have poor cleaning effect.

In contrast, if each of the sodium tripolyphosphate and the sodium metasilicate is comprised in more than 30 wt %, the snow removal effect may be not good because of the decrease content of the main components magnesium chloride and halite. Further, they may be oversaturated in the melt water, causing increased turbidity. The turbid water makes the roads or bridges dirty.

Hereunder is given a description of the preparation method of the snow removal agent of the present invention.

FIG. 1 is the flow chart for the preparation method of the snow removal agent in accordance with an embodiment of the present invention.

First, halite is put in a crusher and crushed (S1). The halite is a main component of the snow removal agent of the present invention and the crushed halite preferably has a size of 7-20 mm.

If the crushed halite is smaller than 7 mm, the snow removal agent may be scattered while being sprayed by a snowplow car or other snowplow devices, resulting in non-uniform snow removal.

In contrast, if the crushed halite is larger than 20 mm, a lot of residues may be generated during the snow removal, resulting in decreased snow removal efficiency and fouling of the roads or bridges.

Subsequently, the crushed halite is aged at room temperature (S2). Preferably, the aging of the halite is carried out for 24-48 hours.

The halite is aged to control the moisture content in the snow removal agent. If the moisture content is large, water may leak out of the snow removal agent during storage, causing the hardening of the snow removal agent. In contrast, if the moisture content is small, a long time is required for snow removal, causing the generation of fine dusts.

Accordingly, the halite is aged at room temperature for more than 24 hours in order to prevent the hardening of the snow removal agent and for less than 48 hours in order to prevent the decrease of the reactivity of the snow removal agent.

Next, the aged halite and magnesium chloride are added to a stirring machine and stirred (S3).

The aged halite and magnesium chloride are added with a given proportion for uniform first mixing.

During the first mixing, the mixture is preferably dried with hot air of $45-55°$ C. while it is stirred.

Magnesium chloride hexahydrate may be used as the magnesium chloride, a main component of the snow removal agent of the present invention. As described earlier in the aging of halite, the moisture control in magnesium chloride hexahydrate is important with regard to the hardening and reactivity of the snow removal agent.

If hot air drying is performed below 45° C., water molecules included in the magnesium chloride hexahydrate are hardly removed, resulting in accelerated hardening of the snow removal agent. In contrast, if hot air drying is performed above 55° C., the magnesium chloride hexahydrate may melt down.

Finally, following the first mixing of halite and magnesium chloride, sodium tripolyphosphate, sodium metasilicate and urea are added and stirred for second mixing (S4).

Sodium tripolyphosphate, sodium metasilicate and urea are mixed into the main components halite and magnesium chloride in order to prevent corrosion of metals, improve cleaning effect and prevent yellowing of plants.

Practical and preferred examples of the present invention are illustrated as shown in the following examples. However, it will be appreciated that those skilled in the art may, in consideration of this disclosure, make modifications and improvements within the spirit and scope of the present invention.

EXAMPLE 1

Halite was crushed to 8 mm in diameter and aged for 24 hours. Then, after adding 37 wt % of magnesium chloride hexahydrate and 60 wt % of halite, the mixture was stirred for 30 minutes in a stirring machine.

During the stirring, the mixture was dried with hot air of 55° C. to remove water included in the magnesium chloride hexahydrate. Then, 1 wt % of urea, 1 wt % of sodium tripolyphosphate and 1 wt % of sodium metasilicate were added to the main component mixture and stirred in the stirring machine for 10 minutes to obtain a snow removal agent.

The snow removal agent prepared by the preparation method of the present invention and a snow removal agent prepared from calcium chloride (Dongyang Chemical, calcium chloride 100 wt %, for comparison) were dissolved in water to obtain 0.5 wt % aqueous solutions each. 20 mL of each of the solutions was given to crape myrtle.

In the crape myrtle to which the snow removal agent prepared by the preparation method of the present invention had been given, only the end part of a few leaves was yellowed. In contrast, most of the leaves of the crape myrtle to which the comparative snow removal agent had been given were yellowed and withered.

EXAMPLE 2

250 mL of water was poured into a 500 mL container. Then, 20 g of each of the snow removal agents of Example 1 was added. A goldfish was put in each container and was observed.

The goldfish put in the container in which the comparative snow removal agent prepared from calcium chloride had been added died and began to decay within 24 hours. In contrast, the goldfish put in the container in which the snow removal agent prepared by the preparation method of the present invention had been added kept alive for more than 7 days.

Consequently, it can be seen that the snow removal agent prepared by the preparation method of the present invention is environment-friendly and unharmful to plants, fish and shellfish.

As apparent from the above description, the snow removal agent of the present invention and the preparation method thereof provide the following advantageous effects.

First, since re-freezing does not occur following the spraying of the snow removal agent, the cost of snow removal agent spraying can be reduced and the chance of accidents can be decreased.

Second, since the snow removal agent is not hardened even in extended period of storage, the snow removal agent needs not be crushed for spraying.

Third, the snow removal agent is environment-friendly and unharmful to plants, fish and shellfish.

Fourth, the corrosion of metals, including, iron structures, automobiles, etc. can be prevented.

Fifth, cracking of the roads due to high heat of dissolution can be prevented.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

What is claimed is:

1. A snow removal agent for melting snow, comprising magnesium chloride, halite, urea, sodium tripolyphosphate and sodium metasilicate, wherein the sodium tripolyphosphate and the sodium metasilicate each account for an identical weight percentage in the agent, wherein the halite is crushed to a size of 7-20 mm and aged for 24-48 hours.

2. The snow removal agent of claim 1, wherein the magnesium chloride is magnesium chloride hexahydrate.

3. The snow removal agent of claim 1, wherein the agent comprises 0.1-30 wt % of sodium tripolyphosphate.

4. The snow removal agent of claim 1, wherein the agent comprises 0.1-30 wt % of sodium metasilicate.

5. The snow removal agent of claim 1, wherein the agent comprises 20-40 wt % of magnesium chloride.

6. The snow removal agent of claim 1, wherein the agent comprises 45-75 wt % of halite.

7. The snow removal agent of claim 1, wherein the agent comprises 0.1-20 wt % of urea.

* * * * *